US00RE46590E

(19) United States
(12) Reissued Patent
Oren

(10) Patent Number: US RE46,590 E
(45) Date of Reissued Patent: Oct. 31, 2017

(54) TRAIN CAR FOR PROPPANT CONTAINERS

(71) Applicant: Oren Technologies, LLC, Houston, TX (US)

(72) Inventor: Joshua Oren, Houston, TX (US)

(73) Assignee: Oren Technologies, LLC, Houston, TX (US)

(21) Appl. No.: 29/537,567

(22) Filed: Aug. 27, 2015

Related U.S. Patent Documents

Reissue of:
(64) Patent No.: Des. 703,582
Issued: Apr. 29, 2014
Appl. No.: 29/455,204
Filed: May 17, 2013

(51) LOC (10) Cl. ..... 12-10
(52) U.S. Cl.
USPC ..... D12/101
(58) Field of Classification Search
USPC ..... D12/19, 100–106, 111, 112, 129; D21/425, 435; D34/12, 16–19, 21–26;
(Continued)

(56) References Cited

U.S. PATENT DOCUMENTS 137,871 A 4/1873 Worsley
150,894 A 5/1874 Safely
(Continued)

FOREIGN PATENT DOCUMENTS

CA 2023138 2/1992
CA 2791088 3/2013
(Continued)

OTHER PUBLICATIONS

International Search Report for PCT/US15/35635, dated Oct. 30, 2015. (12 pages).
(Continued)

*Primary Examiner* — Darlington Ly
(74) *Attorney, Agent, or Firm* — Hogan Lovells US LLP

(57) CLAIM

The ornamental design for a train car for proppant containers, as shown and described.

DESCRIPTION

[FIG. 1 is an upper perspective view of the train car for proppant containers showing my new design.]
[FIG. 2 is a side elevation view thereof;]
[FIG. 3 is an opposite side elevation view thereof;]
[FIG. 4 is a front elevation view thereof;]
[FIG. 5 is a rear elevation view thereof;]
[FIG. 6 is a top plan view thereof; and,]
[FIG. 7 is a bottom plan view thereof.]
*FIG. 8 is an upper perspective view of a train car for proppant containers showing my new design;*
*FIG. 9 is a side elevation view thereof;*
*FIG. 10 is an opposite side elevation view thereof;*
*FIG. 11 is a front elevation view thereof;*
*FIG. 12 is a rear elevation view thereof;*
*FIG. 13 is a top plan view thereof; and,*
*FIG. 14 is a bottom plan view thereof.*
[The features presented in broken lines are for environmental purposes only and form no part of the claimed design.]
*The broken lines in the drawings illustrate environmental structure of the proppant containers and portions of the train car that forms no part of the claimed design.*

1 Claim, 6 Drawing Sheets

Figure 8:
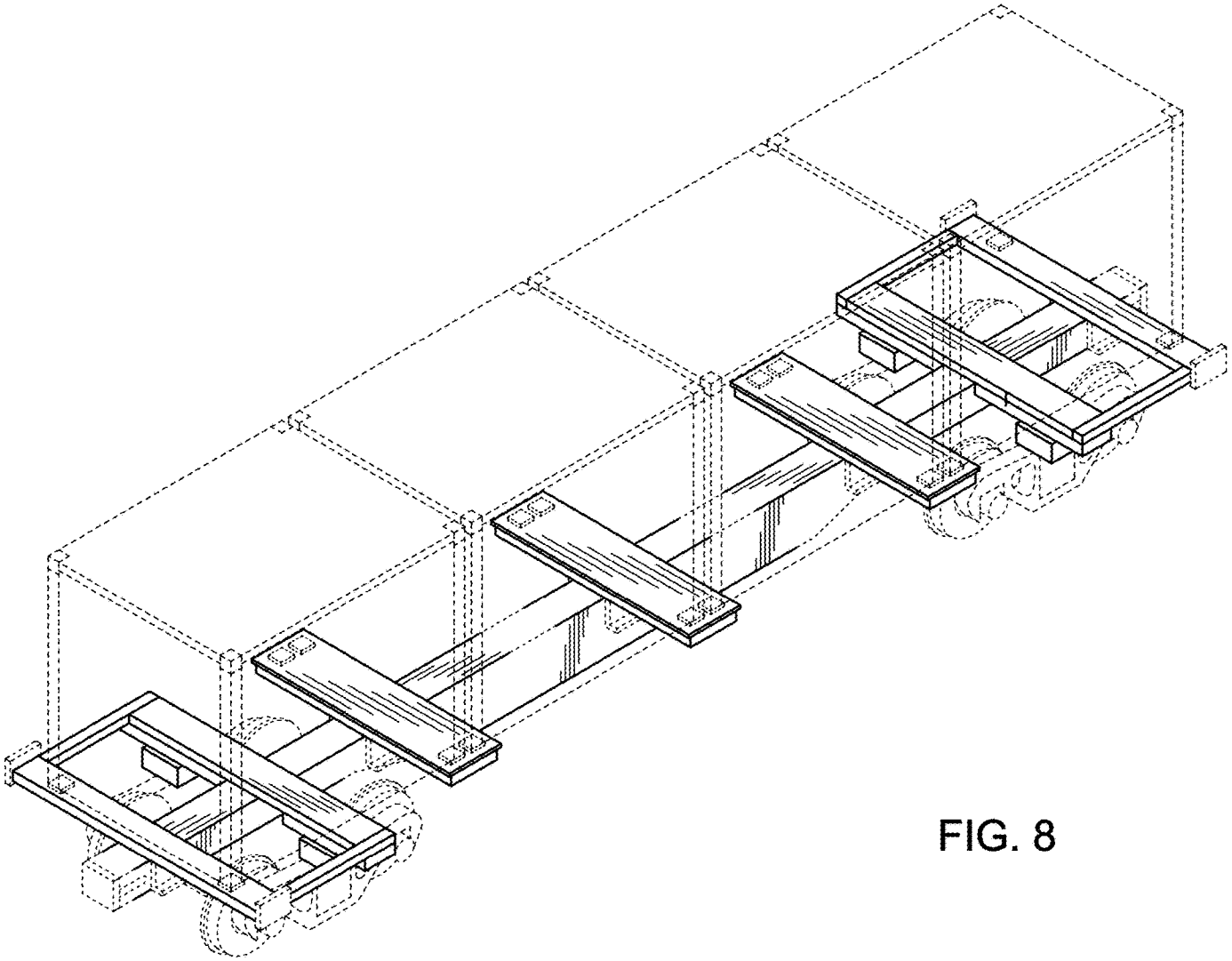
Figure 9:
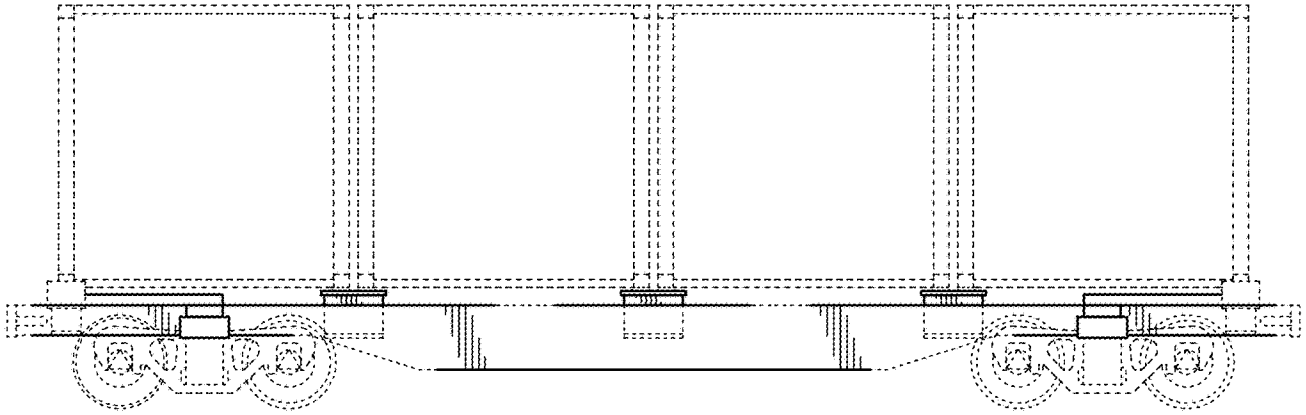
Figure 10:
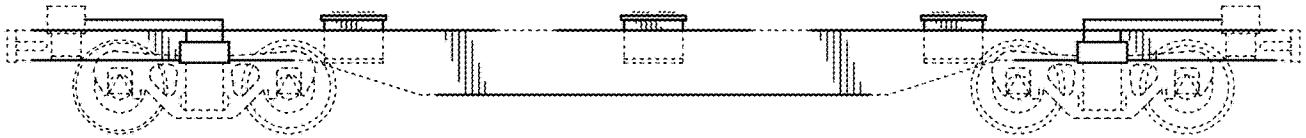
Figure 11:
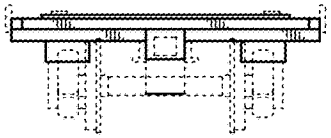
Figure 12:
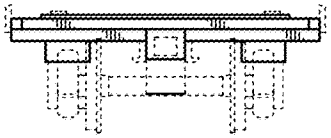
Figure 13:
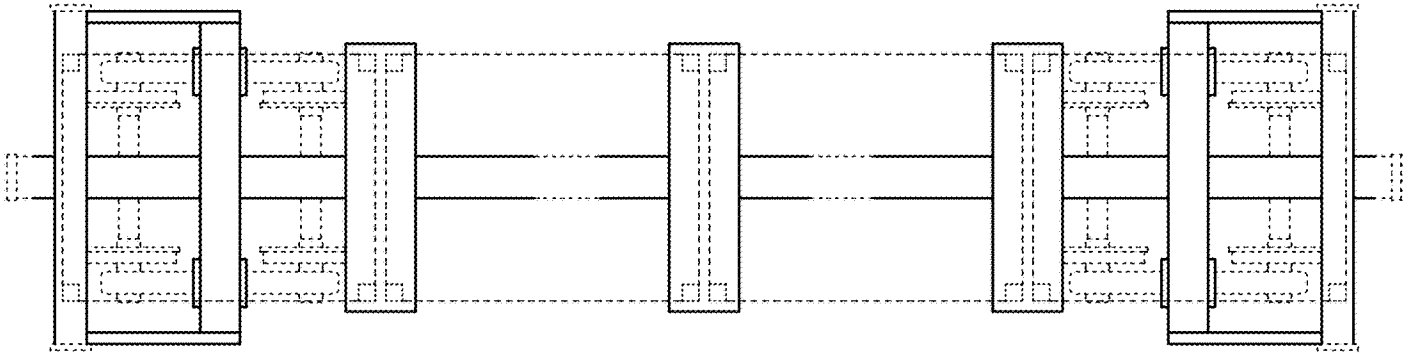
Figure 14:
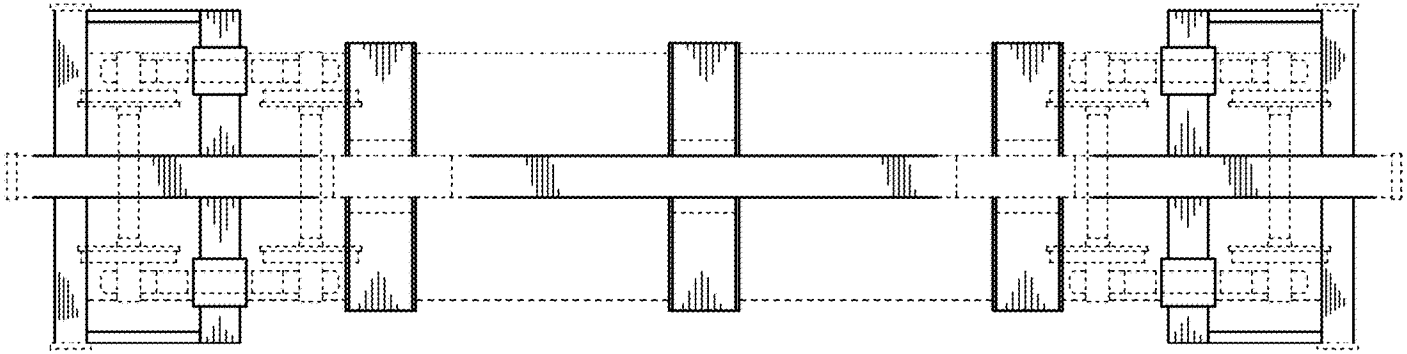

Matter enclosed in heavy brackets [ ] appears in the original patent but forms no part of this reissue; matter printed in italics indicates the additions made by reissue.

Amended

(58) Field of Classification Search
USPC .... 280/63, 204, 205, 475, 482, 647; 296/61, 296/10, 100.01–100.08, 168, 180, 180.2
CPC ..... B60P 1/52; B60P 1/56
See application file for complete search history.

(56) References Cited

U.S. PATENT DOCUMENTS 384,443 A 6/1888 Hoover
448,238 A 3/1891 Johnson
711,632 A 10/1902 Johnson
917,649 A 4/1909 Otto
1,143,641 A 6/1915 McGregor
1,331,883 A 2/1920 Stuart
1,344,768 A 6/1920 Messiter
1,434,488 A 11/1922 Forsythe et al.
1,520,560 A 12/1923 Burno
1,506,936 A 9/1924 Lea
1,526,527 A 2/1925 Butler
1,573,664 A 2/1926 Wetherill
1,807,447 A 5/1931 Smith
1,850,000 A 3/1932 Fernand
1,932,320 A 10/1933 Steward
1,973,312 A 9/1934 Hardinge
2,233,005 A 2/1941 Garlinghouse
2,293,160 A 8/1942 Miller et al.
2,368,672 A 2/1945 McNamara
2,381,103 A 8/1945 Frank
2,423,879 A 7/1947 De Frees
2,564,020 A 8/1951 Mengel
2,603,342 A 7/1952 Martinson
2,616,758 A 11/1952 Meyers
2,622,771 A 12/1952 Tulou
2,652,174 A 9/1953 Shea et al.
2,678,145 A 5/1954 Ejuzwiak et al.
2,693,282 A 11/1954 Sensibar
2,700,574 A 1/1955 Tourneau
2,792,262 A 4/1955 Hathom
2,774,515 A 12/1956 Johansson et al.
2,791,973 A 5/1957 Dorey
2,801,125 A 7/1957 Page et al.
2,808,164 A 10/1957 Glendinning
2,812,970 A 11/1957 Martinson
2,837,369 A 6/1958 Stopps
2,865,521 A 12/1958 Fisher et al.
2,873,036 A 2/1959 Noble
2,894,666 A 7/1959 Campbell, Jr.
2,988,235 A 6/1961 Ronyak
2,994,460 A 8/1961 Matthews
3,049,248 A 8/1962 Heltzel et al.
3,064,832 A 11/1962 Heltzel
3,083,879 A 4/1963 Coleman
3,090,527 A 5/1963 Rensch
3,109,389 A 11/1963 Karlsson
3,122,258 A 2/1964 Raymond
3,135,432 A 6/1964 McKinney
D199,118 S * 9/1964 McKillop ..... D12/102
3,163,127 A 12/1964 Gutridge et al.
3,185,519 A * 5/1965 Turnbull ..... B62D 25/2054 280/789
3,187,684 A 6/1965 Ortner
3,198,494 A 8/1965 Curran et al.
3,199,585 A 8/1965 Cronberger
3,248,026 A 4/1966 Kemp
3,255,927 A 6/1966 Ruppert et al.
3,265,443 A 8/1966 Simas
3,270,921 A 9/1966 Nadolske et al.
3,281,006 A 10/1966 Wei
3,294,306 A 12/1966 Areddy
3,318,473 A 5/1967 Jones et al.
3,353,599 A 11/1967 Swift
3,354,918 A 11/1967 Coleman
3,378,152 A 4/1968 Warner
3,387,570 A 6/1968 Pulcrano et al.
3,396,675 A 8/1968 Stevens
3,397,654 A 8/1968 Snyder
3,406,995 A 10/1968 McCarthy
3,407,971 A 10/1968 Oehler
3,425,599 A 2/1969 Sammamo et al.
3,455,474 A 7/1969 Truncali
3,524,567 A 8/1970 Coleman
3,528,570 A 9/1970 Pase
3,561,633 A 2/1971 Morrison et al.
3,587,834 A 6/1971 Dugge
3,596,609 A 8/1971 Ortner
3,601,244 A 8/1971 Ort et al.
3,602,400 A 8/1971 Cooke
3,650,567 A 3/1972 Danielson
3,653,521 A 4/1972 Bridge
3,661,293 A 5/1972 Gerhard et al.
3,692,363 A 9/1972 Tenebaum et al.
3,704,797 A 12/1972 Suykens
3,721,199 A 3/1973 Hassenauer
3,729,121 A 4/1973 Cannon
3,734,215 A 5/1973 Smith
3,738,511 A 6/1973 Lemon et al.
3,777,909 A 12/1973 Rheinfrank
3,785,534 A 1/1974 Smith
3,800,712 A 4/1974 Krug, Jr.
3,802,584 A 4/1974 Sackett
3,817,261 A 6/1974 Rogge
3,820,762 A 6/1974 Bostrom et al.
3,840,141 A 10/1974 Allom et al.
3,854,612 A 12/1974 Snape
3,861,716 A 1/1975 Baxter et al.
3,879,050 A * 4/1975 Young ..... E04B 1/34352 280/639
3,883,005 A 5/1975 Stevens
3,933,100 A 1/1976 Dugge
3,970,123 A 7/1976 Poulton et al.
3,986,708 A 10/1976 Hellzel et al.
3,997,089 A 12/1976 Clarke et al.
4,003,301 A 1/1977 Norton
4,004,700 A 1/1977 Empey
4,057,153 A 11/1977 Weaver
4,058,239 A 11/1977 Van Mill
4,063,656 A 12/1977 Lambert
4,073,410 A 2/1978 Melcher
4,138,163 A 2/1979 Calvert et al.
4,178,117 A 12/1979 Brugler
4,204,773 A 5/1980 Bates
4,210,273 A 7/1980 Hegele
4,210,963 A 7/1980 Ricciardi et al.
RE30,358 E 8/1980 Sensibar
4,222,498 A 9/1980 Brock
4,227,732 A 10/1980 Kish
4,232,884 A 11/1980 DeWitt
4,239,424 A 12/1980 Pavolka
4,247,228 A 1/1981 Gray et al.
4,258,953 A 3/1981 Johnson
4,265,266 A 5/1981 Kierbow et al.
4,278,190 A 7/1981 Oory et al.
4,282,988 A 8/1981 Hulbert, Jr.
4,287,921 A 9/1981 Sanford
4,287,997 A 9/1981 Rolfe et al.
4,289,353 A 9/1981 Merritt
D263,942 S * 4/1982 Francis ..... D12/101
4,329,106 A 5/1982 Adler
4,350,241 A 9/1982 Wenzel
4,359,176 A 11/1982 Johnson
4,363,396 A 12/1982 Wolf et al.
4,397,406 A 8/1983 Croley
4,398,653 A 8/1983 Daloisio
4,402,392 A 9/1983 Fabian et al.
4,407,202 A 10/1983 McCormick
4,408,886 A 10/1983 Sampson et al.
4,410,106 A 10/1983 Kierbow et al.
4,427,133 A 1/1984 Kierbow et al.
4,428,504 A 1/1984 Bassett et al.
4,449,861 A 5/1984 Saito et al.
4,453,645 A 6/1984 Usui et al.
4,474,204 A 10/1984 West
4,475,672 A 10/1984 Whitehead
4,478,155 A 10/1984 Cena et al.
4,483,462 A 11/1984 Heintz

(56) References Cited

U.S. PATENT DOCUMENTS 4,525,071 A 6/1985 Horowitz
4,532,098 A 7/1985 Campbell
4,569,394 A 2/1986 Sweatman et al.
4,571,143 A 2/1986 Hellerich
4,608,931 A 9/1986 Ruhmann et al.
4,619,531 A 10/1986 Dunstan
4,626,155 A 12/1986 Hlinsky et al.
4,626,166 A 12/1986 Jolly
4,628,825 A 12/1986 Taylor et al.
4,660,733 A 4/1987 Snyder et al.
4,701,095 A 10/1987 Berryman et al.
4,715,754 A 12/1987 Scully
4,738,774 A 4/1988 Patrick
4,741,273 A 5/1988 Sherwood
4,801,389 A 1/1989 Brannon et al.
4,819,830 A 4/1989 Schultz
4,848,605 A 7/1989 Wise
4,882,784 A 11/1989 Tump
4,889,219 A 12/1989 Key
4,901,649 A 2/1990 Fehrenbach et al.
4,909,378 A 3/1990 Webb
4,909,556 A 3/1990 Koskinen
4,917,019 A 4/1990 Hesch et al.
4,919,583 A 4/1990 Speakman, Jr.
4,923,358 A 5/1990 Van Mill
4,946,068 A 8/1990 Erickson et al.
4,947,760 A 8/1990 Dawson et al.
4,954,975 A 9/1990 Kalata
4,956,821 A 9/1990 Fenelon
4,975,205 A 12/1990 Sloan
4,995,522 A 2/1991 Barr
5,004,400 A 4/1991 Handke
5,042,538 A 8/1991 Wiese
5,069,352 A 12/1991 Harbolt et al.
5,080,259 A 1/1992 Hadley
5,082,304 A 1/1992 Preller
5,102,281 A 4/1992 Handke
5,102,286 A 4/1992 Fenton
5,105,858 A 4/1992 Levinson
5,131,524 A 7/1992 Uehara
5,190,182 A 3/1993 Copas et al.
5,191,842 A * 3/1993 Tinkler ..... B61D 3/16 105/355
5,195,861 A 3/1993 Handke
5,199,826 A 4/1993 Lawrence
5,201,546 A * 4/1993 Lindsay ..... E04B 5/14 280/789
5,224,635 A 7/1993 Wise
5,253,746 A 10/1993 Friesen et al.
5,253,776 A 10/1993 Decroix et al.
5,265,763 A 11/1993 Heinrici et al.
5,286,158 A 2/1994 Zimmerman
5,290,139 A 3/1994 Hedrick
5,320,046 A 6/1994 Hesch
5,324,097 A 6/1994 DeCap
5,339,996 A 8/1994 Dubbert
5,351,990 A * 10/1994 Thomas ..... B62D 53/061 280/789
5,358,137 A 10/1994 Shuert et al.
5,373,792 A 12/1994 Pileggi et al.
5,402,915 A 4/1995 Hogan
5,413,154 A 5/1995 Hurst et al.
5,429,259 A 7/1995 Robin
5,441,321 A 8/1995 Karpisek
5,445,289 A 8/1995 Owen
5,465,829 A 11/1995 Kruse
5,470,175 A 11/1995 Jensen et al.
5,493,852 A 2/1996 Stewart
5,538,286 A 7/1996 Hoff
5,549,278 A 8/1996 Sidler
5,564,599 A 10/1996 Barber et al.
5,570,743 A 11/1996 Padgett et al.
5,590,976 A 1/1997 Kilheffer et al.
5,601,181 A 2/1997 Lindhorst
5,602,761 A 2/1997 Spoerre et al.
5,613,446 A 3/1997 DiLuigi et al.
5,617,974 A 4/1997 Sawyer
5,647,514 A 7/1997 Toth et al.
RE35,580 E 8/1997 Heider et al.
5,667,298 A 9/1997 Musil
5,687,881 A 11/1997 Rouse et al.
5,690,466 A 11/1997 Gaddis et al.
5,697,535 A 12/1997 Coleman
5,706,614 A 1/1998 Wiley et al.
5,718,555 A 2/1998 Swalheim
5,722,552 A 3/1998 Olson
5,761,854 A 6/1998 Johnson et al.
5,762,222 A 6/1998 Liu
5,772,390 A 6/1998 Walker
5,782,524 A 7/1998 Heider et al.
5,785,421 A 7/1998 Milek
5,803,296 A 9/1998 Olson
5,806,863 A 9/1998 Heger et al.
5,836,480 A 11/1998 Epp et al.
5,845,799 A 12/1998 Deaton
5,876,172 A 3/1999 Di Rosa
5,906,471 A 5/1999 Schwoerer
5,911,337 A 6/1999 Bedeker
5,927,558 A 7/1999 Bruce
5,971,219 A 10/1999 Karpisek
6,002,063 A 12/1999 Bilak et al.
6,006,918 A 12/1999 Hart
6,069,118 A 5/2000 Hinkel et al.
6,077,068 A 6/2000 Okumura
6,092,974 A 7/2000 Roth
6,109,486 A 8/2000 Lee
6,120,233 A 9/2000 Adam
6,155,175 A 12/2000 Rude et al.
6,186,654 B1 2/2001 Gunteret et al.
6,190,107 B1 2/2001 Lanigan et al.
6,192,985 B1 2/2001 Hinkel et al.
6,196,590 B1 3/2001 Kim
6,205,938 B1 3/2001 Foley et al.
6,247,594 B1 6/2001 Garton
6,263,803 B1 7/2001 Dohr et al.
6,269,849 B1 8/2001 Fields
6,283,212 B1 9/2001 Hinkel et al.
6,286,986 B2 9/2001 Grimland
6,296,109 B1 10/2001 Nohl
6,306,800 B1 10/2001 Samuel et al.
6,328,156 B1 12/2001 Otsman
6,328,183 B1 12/2001 Coleman
6,364,584 B1 4/2002 Taylor
6,374,915 B1 4/2002 Andrews
6,382,446 B1 5/2002 Hinkle et al.
6,401,983 B1 6/2002 McDonald et al.
6,412,422 B2 7/2002 Dohr et al.
6,415,909 B1 7/2002 Mitchell et al.
6,416,271 B1 7/2002 Pigott et al.
6,425,725 B1 7/2002 Ehlers
6,457,291 B2 10/2002 Wick
6,505,760 B1 1/2003 Werner
6,508,387 B1 1/2003 Simon et al.
6,508,615 B2 1/2003 Taylor
6,523,482 B2 2/2003 Wingate
6,537,002 B2 3/2003 Gloystein
6,543,368 B1 * 4/2003 Forbes ..... B61D 45/003 105/396
6,575,614 B2 6/2003 Tosco et al.
6,660,693 B2 12/2003 Miller et al.
6,666,573 B2 12/2003 Grassi
6,668,496 B1 * 12/2003 Clapp et al. ..... B60P 3/32 52/745.02
6,675,073 B2 1/2004 Kieman et al.
6,705,449 B2 3/2004 Wagstaffe
6,720,290 B2 4/2004 England et al.
6,772,912 B1 8/2004 Schall et al.
6,774,318 B2 8/2004 Beal et al.
6,776,235 B1 8/2004 England
6,783,032 B2 8/2004 Fons
6,811,048 B2 11/2004 Lau
6,828,280 B2 12/2004 England et al.
6,835,041 B1 12/2004 Albert
6,882,960 B2 4/2005 Miller

(56) References Cited

U.S. PATENT DOCUMENTS 6,902,061 B1 6/2005 Elstone
6,915,854 B2 7/2005 England et al.
6,932,388 B2 * 8/2005 Few ..... B60G 3/12 280/787
6,953,119 B1 10/2005 Wening
6,955,127 B2 10/2005 Taylor
6,964,551 B1 11/2005 Friesen
6,968,946 B2 11/2005 Shuert
6,974,021 B1 12/2005 Boevers
7,008,163 B2 3/2006 Russell
7,051,661 B2 5/2006 Herzog et al.
7,084,095 B2 8/2006 Lee et al.
7,104,425 B2 9/2006 Le Roy
7,140,516 B2 11/2006 Bothor
7,146,914 B2 12/2006 Morton et al.
7,201,290 B2 4/2007 Mehus et al.
7,214,028 B2 5/2007 Boasso
7,228,805 B2 * 6/2007 Beers et al. ..... 105/423
7,240,681 B2 7/2007 Saik
7,252,309 B2 8/2007 Eng Soon et al.
7,284,579 B2 10/2007 Elgan et al.
7,316,333 B2 1/2008 Wegner
7,367,271 B2 5/2008 Early
7,377,219 B2 5/2008 Brandt
7,410,623 B2 8/2008 Mehus et al.
7,475,796 B2 1/2009 Garton
7,478,600 B2 * 1/2009 Beers et al. ..... 105/423
7,500,817 B2 3/2009 Furrer et al.
7,513,280 B2 4/2009 Brashears et al.
7,591,386 B2 9/2009 Hooper
7,640,075 B2 12/2009 Wietgrefe
7,753,637 B2 7/2010 Benedict et al.
7,798,558 B2 9/2010 Messier
7,802,958 B2 9/2010 Garcia et al.
7,803,321 B2 9/2010 Lark et al.
7,837,427 B2 11/2010 Beckel
7,841,394 B2 11/2010 McNeel et al.
7,845,516 B2 12/2010 Pessin et al.
7,858,888 B2 12/2010 Lucas et al.
7,891,304 B2 2/2011 Herzog et al.
7,891,523 B2 2/2011 Mehus et al.
7,896,198 B2 3/2011 Mehus et al.
7,921,783 B2 4/2011 Forbes et al.
7,967,161 B2 6/2011 Townsend
7,980,803 B2 7/2011 Brandstatter et al.
7,997,623 B2 8/2011 Williams
D648,656 S * 11/2011 Crane ..... D12/101
D649,912 S * 12/2011 Chen ..... D12/101
8,083,083 B1 12/2011 Mohns
8,201,520 B2 6/2012 Meritt
8,313,278 B2 11/2012 Simmons et al.
8,366,349 B2 2/2013 Beachner
8,379,927 B2 2/2013 Taylor
8,387,824 B2 3/2013 Wietgrefe
8,393,502 B2 3/2013 Renyer et al.
8,424,666 B2 4/2013 Beming et al.
D688,351 S 8/2013 Oren
D688,597 S * 8/2013 Oren ..... D12/101
8,505,780 B2 8/2013 Oren
8,545,148 B2 10/2013 Wanek-Pusset et al.
8,562,022 B2 10/2013 Nadeau et al.
8,573,387 B2 11/2013 Trimble
8,573,917 B2 11/2013 Renyer
8,585,341 B1 11/2013 Oren
D694,670 S * 12/2013 Oren ..... D12/101
8,616,370 B2 12/2013 Allegretti
8,622,251 B2 1/2014 Oren
8,636,832 B2 1/2014 Stutzman et al.
8,646,641 B2 2/2014 Moir
8,668,430 B2 3/2014 Oren
D703,582 S * 4/2014 Oren ..... D12/42
8,820,559 B2 9/2014 Beitler et al.
8,827,118 B2 9/2014 Oren
8,887,914 B2 11/2014 Allegretti
8,905,266 B2 12/2014 De Brabanter
8,915,691 B2 12/2014 Mintz
9,051,801 B1 6/2015 Mintz
9,052,034 B1 6/2015 Wegner et al.
2001/0022308 A1 9/2001 Epp et al.
2001/0045338 A1 11/2001 Ransil et al.
2002/0134550 A1 9/2002 Leeson et al.
2002/0139643 A1 10/2002 Peltier et al.
2003/0111470 A1 6/2003 Fouillet et al.
2003/0156929 A1 8/2003 Russell
2004/0065699 A1 4/2004 Schoer et al.
2004/0074922 A1 4/2004 Bother et al.
2004/0084874 A1 5/2004 McDougall et al.
2004/0206646 A1 10/2004 Goh
2004/0245284 A1 12/2004 Mehus et al.
2005/0158158 A1 7/2005 Porta
2005/0178285 A1 * 8/2005 Beers et al. ..... B60P 3/20 105/404
2005/0201851 A1 9/2005 Jonkka
2006/0012183 A1 1/2006 Marchiori et al.
2006/0027582 A1 2/2006 Beach
2006/0151058 A1 7/2006 Salaoras et al.
2006/0180062 A1 8/2006 Furrer et al.
2006/0180232 A1 8/2006 Glewwe et al.
2006/0239806 A1 10/2006 Yelton
2006/0267377 A1 11/2006 Lusk et al.
2006/0277783 A1 12/2006 Garton
2006/0289166 A1 12/2006 Stromquist et al.
2007/0096537 A1 5/2007 Hicks
2007/0125543 A1 6/2007 McNeel et al.
2007/0234927 A1 * 10/2007 Beers et al. ..... B61D 17/005 105/404
2008/0008562 A1 1/2008 Beckel et al.
2008/0029546 A1 2/2008 Shuld
2008/0029553 A1 2/2008 Culleton
2008/0017905 A1 7/2008 McGough et al.
2008/0179054 A1 7/2008 McGough et al.
2008/0179324 A1 7/2008 McGough et al.
2008/0213073 A1 9/2008 Benedict et al.
2008/0226434 A1 9/2008 Smith et al.
2008/0264641 A1 10/2008 Slabaugh et al.
2008/0277423 A1 11/2008 Garton
2009/0038242 A1 2/2009 Cope
2009/0078410 A1 3/2009 Krenek et al.
2009/0278326 A1 11/2009 Rowland et al.
2010/0021258 A1 1/2010 Kim
2010/0038143 A1 2/2010 Burnett et al.
2010/0040446 A1 2/2010 Renyer
2010/0065466 A1 3/2010 Perkins
2010/0108711 A1 5/2010 Wietgrefe
2010/0278621 A1 11/2010 Redekop
2010/0288603 A1 11/2010 Schafer
2011/0011893 A1 1/2011 Cerny
2011/0017693 A1 1/2011 Thomas
2011/0101040 A1 5/2011 Weissbrod
2011/0109703 A1 5/2011 Williams
2011/0127178 A1 6/2011 Claussen
2011/0160104 A1 6/2011 Wu et al.
2011/0162838 A1 7/2011 Mackenzie et al.
2011/0168593 A1 7/2011 Neufeld et al.
2011/0222983 A1 9/2011 Dugic et al.
2011/0297702 A1 12/2011 Hildebrandt et al.
2012/0103848 A1 5/2012 Allegretti et al.
2012/0219391 A1 8/2012 Teichrob et al.
2013/0004272 A1 1/2013 Mintz
2013/0022441 A1 1/2013 Uhlyn et al.
2013/0206415 A1 8/2013 Sheesley
2013/0209204 A1 8/2013 Sheesley
2013/0233545 A1 9/2013 Mahoney
2013/0284729 A1 10/2013 Cook et al.
2013/0309052 A1 11/2013 Luharuka
2013/0323005 A1 12/2013 Rexius et al.
2014/0020765 A1 1/2014 Oren
2014/0020892 A1 1/2014 Oren
2014/0023465 A1 1/2014 Oren et al.
2014/0044507 A1 2/2014 Naizer et al.
2014/0083554 A1 3/2014 Harris
2014/0097182 A1 4/2014 Sheesley
2014/0166647 A1 6/2014 Sheesley
2014/0203046 A1 7/2014 Allegretti

(56) References Cited

U.S. PATENT DOCUMENTS

| | | | | |
|---|---|---|---|---|
| 2014/0234059 | A1 | 8/2014 | Thomeer | |
| 2014/0305769 | A1 | 10/2014 | Eiden et al. | |
| 2014/0321950 | A1 | 10/2014 | Krenek et al. | |
| 2015/0069052 | A1 | 3/2015 | Allegretti et al. | |
| 2015/0086307 | A1 | 3/2015 | Stefan | |
| 2015/0224905 | A1* | 8/2015 | Oren | B60P 1/56 414/518 |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2640598 | 6/1990 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 1990008082 | 7/1990 |
| WO | 1992002437 | 2/1992 |
| WO | 1993001997 | 2/1993 |
| WO | 1993006031 | 4/1993 |
| WO | 2006039757 | 4/2006 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File history for U.S. Appl. No. 61/538,616, Robert A. Harris, filed Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
PCT International Search Report for PCT/US615/57601, dated May 6, 2016. (11 pages).
PCT International Search Report for PCT/US15/49074, dated Dec. 17, 2015. (11 pages).
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.

(56) References Cited

OTHER PUBLICATIONS

Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.

* cited by examiner

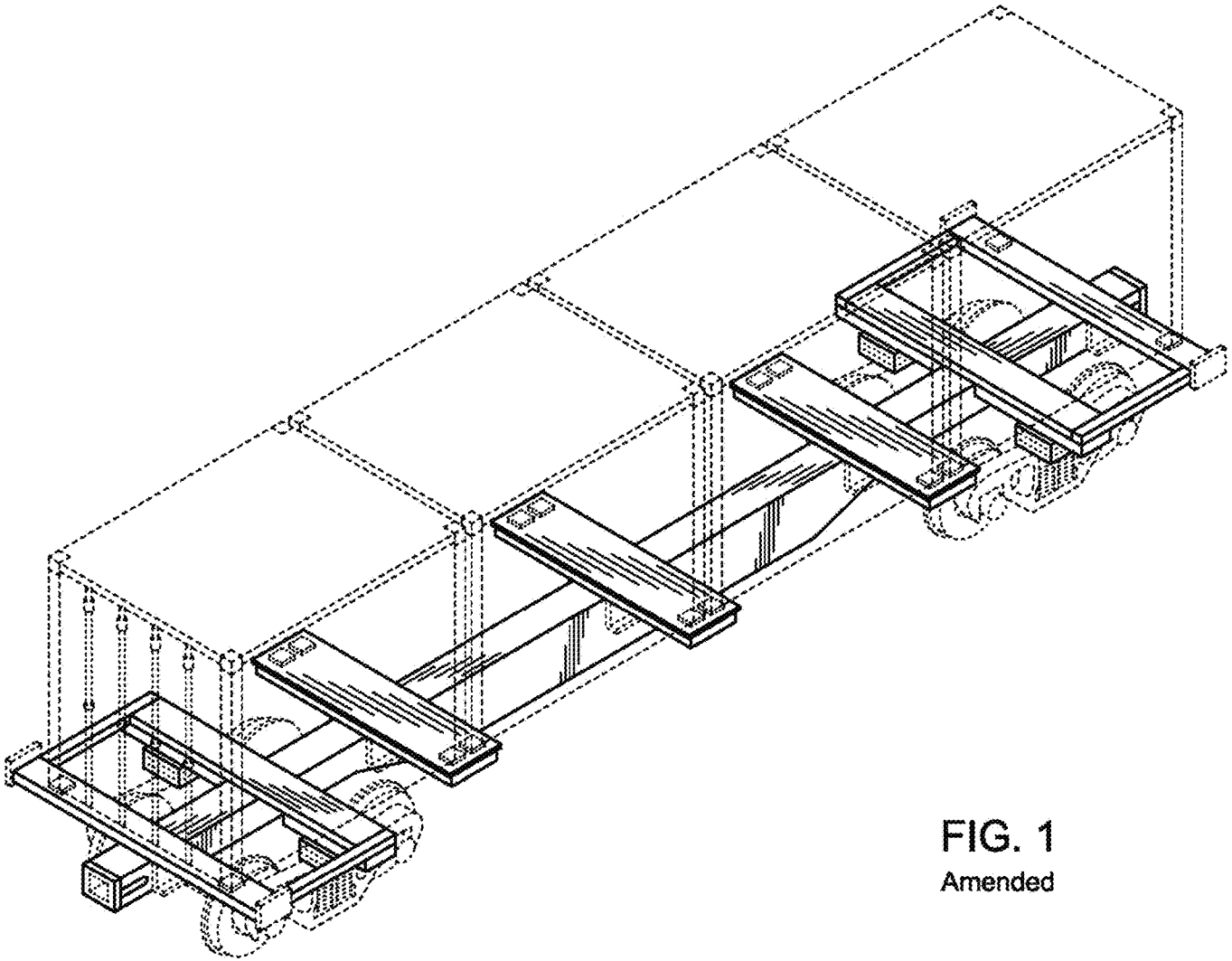
FIG. 1
Amended

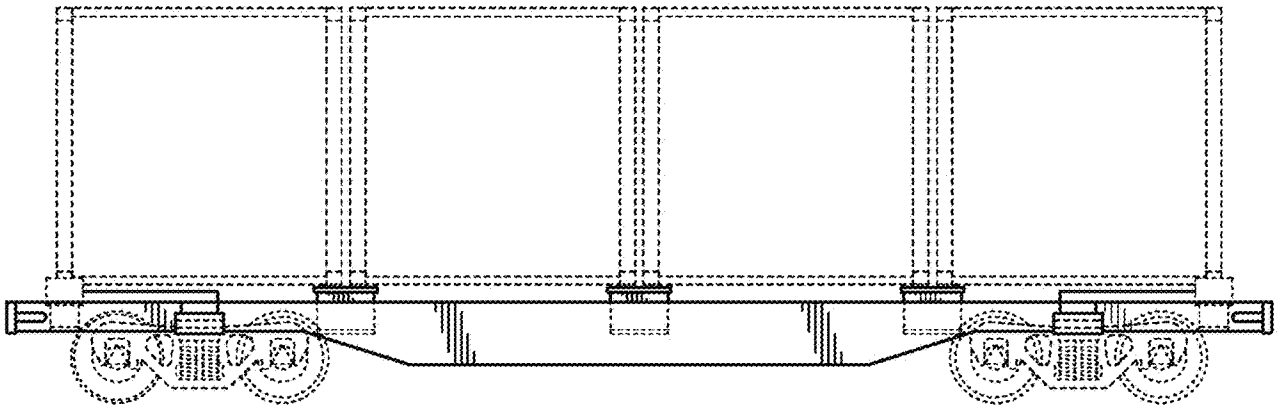
FIG. 2
Amended
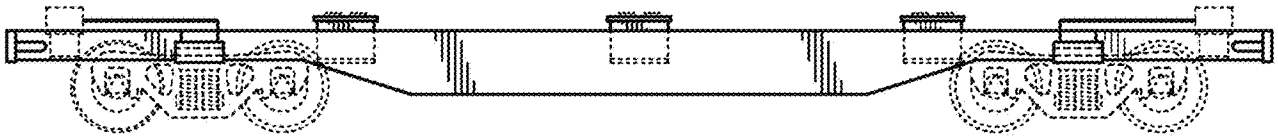
FIG. 3
Amended
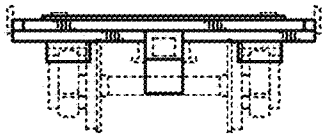
FIG. 5
Amended
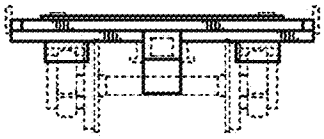
FIG. 4
Amended

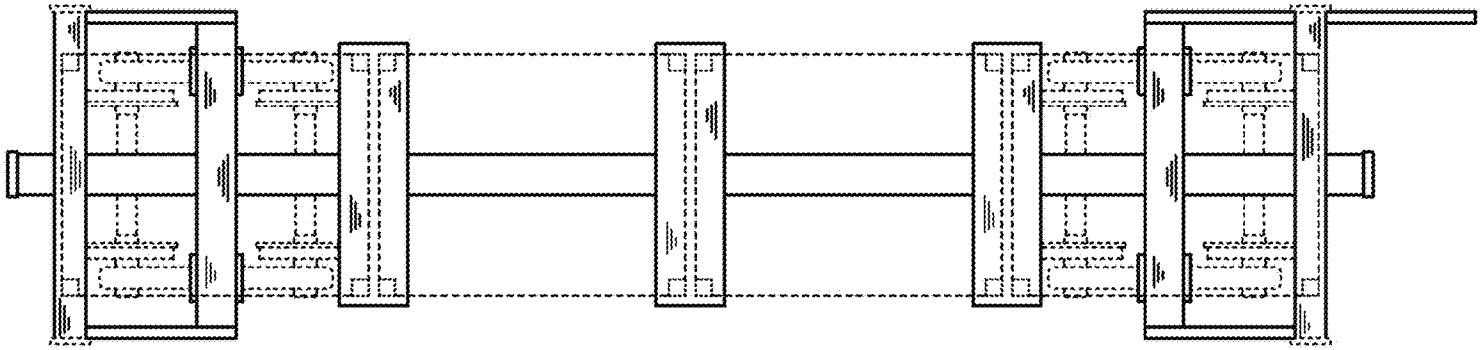
FIG. 6
Amended
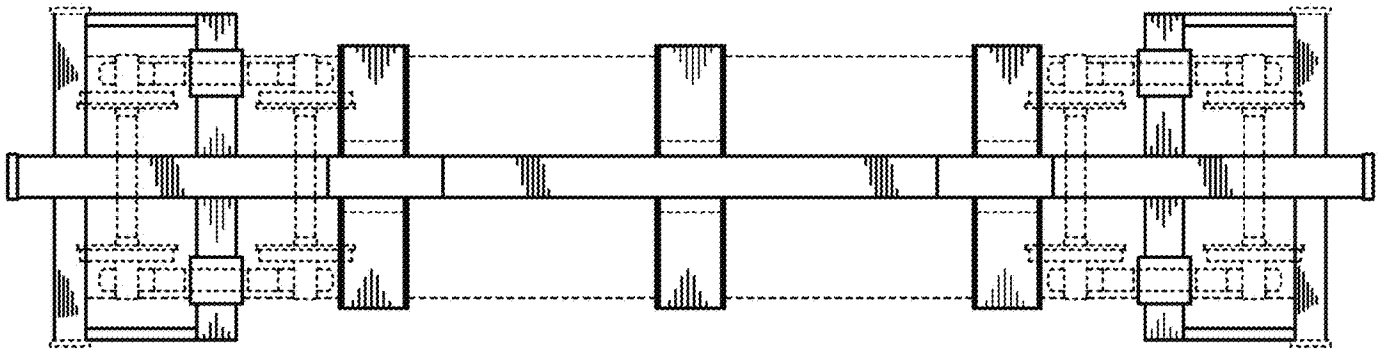
FIG. 7
Amended